United States Patent
Wu et al.

(10) Patent No.: US 11,807,719 B2
(45) Date of Patent: Nov. 7, 2023

(54) CLEAR POLYAMIDE RESINS, ARTICLES, AND METHODS

(71) Applicant: Shakespeare Company, LLC, Greer, SC (US)

(72) Inventors: Yuhong Wu, Columbia, SC (US); Keith D. Parks, Matthews, NC (US); Alfred O. Jessee, Lugoff, SC (US); Saumitra Bhargava, Clarksville, MD (US)

(73) Assignee: SHAKESPEARE COMPANY, LLC, Greer, SC (US)

( * ) Notice: Subject to any disclaimer, the term of this patent is extended or adjusted under 35 U.S.C. 154(b) by 265 days.

(21) Appl. No.: 16/670,148

(22) Filed: Oct. 31, 2019

(65) Prior Publication Data
US 2020/0131312 A1   Apr. 30, 2020

Related U.S. Application Data

(60) Provisional application No. 62/753,149, filed on Oct. 31, 2018.

(51) Int. Cl.
| | |
|---|---|
| *C08G 69/26* | (2006.01) |
| *B32B 27/08* | (2006.01) |
| *B32B 27/28* | (2006.01) |
| *B32B 27/34* | (2006.01) |
| *B32B 27/36* | (2006.01) |
| *C08G 69/28* | (2006.01) |
| *B29C 45/14* | (2006.01) |
| *C08L 77/06* | (2006.01) |
| *B29K 75/00* | (2006.01) |
| *B29K 77/00* | (2006.01) |

(52) U.S. Cl.
CPC ...... *C08G 69/265* (2013.01); *B29C 45/14811* (2013.01); *B32B 27/08* (2013.01); *B32B 27/285* (2013.01); *B32B 27/34* (2013.01); *B32B 27/36* (2013.01); *C08G 69/28* (2013.01); *C08L 77/06* (2013.01); *B29C 45/14* (2013.01); *B29K 2075/00* (2013.01); *B29K 2077/00* (2013.01); *B29K 2995/0018* (2013.01); *B32B 2274/00* (2013.01); *C08L 2201/10* (2013.01); *C08L 2203/20* (2013.01); *C08L 2203/30* (2013.01)

(58) Field of Classification Search
CPC ....... C08L 77/06; C08G 69/26; C08G 69/265; C08J 2377/06
See application file for complete search history.

(56) References Cited

U.S. PATENT DOCUMENTS

| | | |
|---|---|---|
| 6,008,288 A | 12/1999 | Dalla Torre |
| 6,943,231 B2 | 9/2005 | Buhler |
| 6,958,374 B2 | 10/2005 | Buhler |
| 7,910,652 B2 | 3/2011 | Schwitter et al. |
| 8,268,956 B2 | 9/2012 | Buhler et al. |
| 9,403,942 B2 | 8/2016 | Buhler et al. |
| 2003/0235666 A1* | 12/2003 | Buhler ............. C08G 69/265 528/335 |
| 2008/0119632 A1 | 5/2008 | Baumann et al. |
| 2008/0135720 A1* | 6/2008 | Buhler ........... B29D 11/00009 249/134 |
| 2011/0105697 A1 | 5/2011 | Severin et al. |
| 2016/0271919 A1* | 9/2016 | Berger ............. C08L 51/04 |
| 2018/0066108 A1 | 3/2018 | Saillard et al. |
| 2018/0171074 A1* | 6/2018 | Wiedemann ....... C08G 69/28 |
| 2018/0298191 A1 | 10/2018 | Schubert et al. |

FOREIGN PATENT DOCUMENTS

WO   2012/058348 A1   5/2012

OTHER PUBLICATIONS

Grilamid TR 90 Technical Data Sheet, LHT/04.01, www.emsgrivory.com.
International Search Report and Written Opinion for International Application No. PCT/US2019/059148 dated Feb. 6, 2020 (16 pages).

* cited by examiner

*Primary Examiner* — Gregory Listvoyb
(74) *Attorney, Agent, or Firm* — Eversheds Sutherland (US) LLP

(57) ABSTRACT

Polyamide resins including the reaction product of an intimate mixture of at least two monomers selected from HMDA and a diamine; and an organic diacid, wherein sebacic acid is present in the organic diacid in an amount of less than or equal to about 50 mol. %, and associated articles and methods are provided herein.

19 Claims, 3 Drawing Sheets

CLEAR POLYAMIDE RESINS, ARTICLES, AND METHODS

CROSS-REFERENCE TO RELATED APPLICATIONS

This application claims priority to U.S. Provisional Patent Application No. 62/753,149, filed Oct. 31, 2018, which is incorporated by reference herein in its entirety.

FIELD OF THE DISCLOSURE

This disclosure relates to polymer resins, particularly polyamide resins, articles made therefrom, and methods of making the same.

BACKGROUND

Polyamide resins, such as nylon, are used in a wide variety of products. Clear and tough polyamide resins, which incorporate dyes and pigments to achieve deep, rich colors, are particularly useful in consumer articles, such as headphones.

However, commercially-available polyamide resins are typically not clear. Commercially-available clear polyamide resins, which are often made by reacting hexamethylene diamine (HDMA) with sebacic acid and one or more other organic diacids, are relatively opaque due to their crystallinity.

Amorphous polyamide resins, such as polyamide 6116T made with hexamethylene diamine (HMDA), isophthalic acid, and terephthalic acid, suffer from poor chemical resistance, poor paintability, poor mechanical impact properties, and inability to bond to polyurethanes for overmolding, each of which limits their usability.

Further, commercially-available clear polyamide resins, such as MACM (diamine) C12 diacid (dodecanedioic acid, diacid) and polyamide resins and other polyamide resins described in German Patent No. DE 10224947B4, the entirety of which is hereby incorporated herein by reference, often suffer from molding deficiencies. In particular, commercially-available clear polyamide resins cannot be continuously molded, at least because they require the use of mold-release sprays intermittently in the molding process. This application of mold-release spray results in downtime and significant added expense when producing molded products using these resins. Additionally, if the mold-release spray is insufficiently or incorrect applied, the molded article often cannot be removed without damaging and/or deforming the article. This resin also suffers from poor bonding to polyurethanes during overmolding.

Accordingly, improved resins and methods of making the same are needed.

SUMMARY

In one aspect, polyamide resins are provided. In one embodiment, a polyamide resin is provided including the reaction product of an intimate mixture of: at least two monomers selected from HMDA and a diamine; and an organic diacid, wherein sebacic acid is present in the organic diacid in an amount of less than or equal to about 50 mol. %.

In another aspect, articles are provided. In one embodiment, an article is provided including a polyamide resin which includes the reaction product of an intimate mixture of: at least two monomers selected from HMDA and a diamine; and an organic diacid, wherein sebacic acid is present in the organic diacid in an amount of less than or equal to about 50 mol. %.

In another aspect, methods of making polyamide resins are provided. In one embodiment, a method of making a polyamide resin is provided including combining at least two monomers selected from HMDA and a diacid in a reaction vessel under pressure to form a polyamide resin, wherein sebacic acid is present in the organic diacid in an amount of less than or equal to about 50 mol. %.

DETAILED DESCRIPTION

Figure 3:
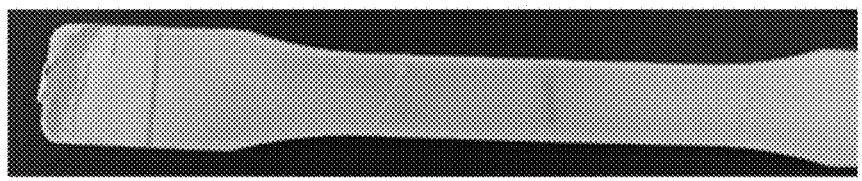
FIG. 3 is a photograph of a sample of a Shakespeare Company resin made by reacting a diamine composition comprising 50 mol. % HMDA and 50 mol. % DMDC with a diacid composition comprising 75 mol. % sebacic acid and 25 mol. % isophthalic acid, after soaking in ethanol under bending stress.

Improved polyamide resins, articles made therefrom, and methods of making the same are provided herein.

As used herein, "BAC" is used to refer to 1,3-Bis(Aminomethyl)cyclohexane, a chemical having the structure:

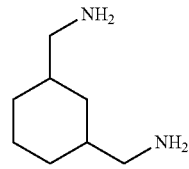

As used herein, "DMDC" is used to refer to 4,4'-Methylenebis(2-methylcyclohexylamine), a chemical having the structure:

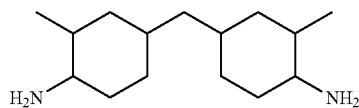 [SMILES: CC1CC(CC2CCC(N)C(C)C2)CCC1N]

As used herein, "MACM" is used to refer to 3,3' dimethyl-4,4' diaminodicyclohexylmethane, a chemical having the structure:

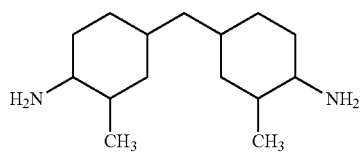 [SMILES: CC1CC(CC2CCC(N)C(C)C2)CCC1N]

As used herein, "MPMD" is used to refer to 2-methyl-1,5-pentanediamine, a chemical having the structure:

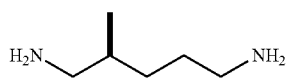

As used herein, "HMDA" is used to refer to 1,6 Hexanediamine, a chemical having the structure:

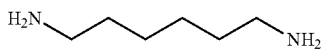

As used herein, "IPDA" is used to refer to isophoronediamine, synonymously referred to as 5-amino-1,3,3-trimethylcyclohexanemethylamine, a chemical having the structure:

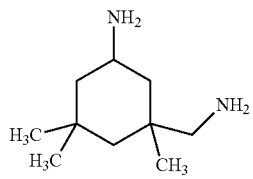

If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

In some embodiments, polyamide terpolymer resins are provided which include the reaction product of an intimate mixture of at least two monomers selected from HMDA and a diamine; and an organic diacid, wherein sebacic acid is present in the organic diacid in an amount of less than or equal to about 50 mol. %. In some embodiments, the diamine is a cycloaliphatic diamine. For example, in some embodiments the cycloaliphatic diamine is selected from BAC, DMDC, MACM, IPDA, or any combination thereof. In some embodiments, the diamine is selected from MPMD, HMDA, and any combination thereof. In some embodiments, methods of producing polyamide resins are provided which include reacting an intimate mixture of at least two monomers selected from HMDA and a diamine and an organic diacid under pressure, wherein sebacic acid is present in the organic diacid in an amount of less than or equal to about 50 mol. %. In some embodiments, the organic diacid is substantially free of sebacic acid.

As used herein, the terms "substantially free" refers to the organic diacid containing not more than residual or negligible amounts of sebacic acid, such as less than 4 percent, by weight of the organic diacid, for example from 1 to 4 percent, by weight of the organic diacid. Sebacic acid is often a particularly desirable commercial reagent for polyamide resins, at least because bio-based sebacic acid, or sebacic acid which is at least in part derived from plant-based materials, is commercially available. However, without intending to be bound by any particular theory, it is believed that replacing sebacic acid with other aliphatic carboxylic acids produces polyamide resins with improved clarity and physical properties.

In some embodiments, the at least two monomers and the organic diacid are reacted at a pressure of from 20 psi to about 200 psi, for example about 20 psi, about 50 psi, about 100 psi, about 150 psi, about 200 psi, and any ranges therebetween. In some embodiments, the at least two monomers and the organic diacid are reacted until reaching a target melt flow index of from about 0.5 g/10 min to about 10 g/10 min when measured at 250° C. and a 2160 g load according to ASTM D1238, for example a target melt flow index of about 0.5 g/10 min, about 1 g/10 min, 2 g/10 min, about 3 g/10 min, about 4 g/10 min, about 5 g/10 min, about 6 g/10 min, about 7 g/10 min, about 8 g/10 min, about 9 g/10 min, about 10 g/10 min, and any ranges therebetween.

In some embodiments, the at least two monomers are a combination of HMDA and DMDC. In some embodiments, HMDA is present in the at least two monomers in an amount from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. In some embodiments, the DMDC is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. For example, in one embodiment, the HMDA is present in the at least two monomers in an amount of about 50 mol. % and the DMDC is present in the at least two monomers in an amount of about 50 mol. %. In another embodiment, the HMDA is present in the at least two monomers in an amount of about 30 mol. % and the DMDC is present in the at least two monomers in an amount of about 70 mol. %

In some embodiments, the at least two monomers are a combination of a cycloaliphatic diamine and DMDC. In some embodiments, the cycloaliphatic diamine may be BAC, IPDA, MACM, or any combinations thereof. In some embodiments, the cycloaliphatic diamine is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. In some embodiments, the DMDC is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. For example, in one embodiment, the cycloaliphatic diamine is present in the at least two monomers in an amount of about 50 mol. % and the DMDC is present in the at least two monomers in an amount of about 50 mol. %.

In some embodiments, the at least two monomers are a combination of BAC and DMDC. In some embodiments, the BAC is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. In some embodiments, the DMDC is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. For example, in one embodiment, the BAC is present in the at least two monomers in an amount of about 50 mol. % and the DMDC is present in the at least two monomers in an amount of about 50 mol. %.

In some embodiments, the at least two monomers are a combination of IPDA and DMDC. In some embodiments, the IPDA is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. In some embodiments, the DMDC is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. For example, in one embodiment, the IPDA is present in the at least two monomers in an amount of about 50 mol. % and the DMDC is present in the at least two monomers in an amount of about 50 mol. %.

In some embodiments, the at least two monomers are a combination of DMDC and MPMD. In some embodiments, the DMDC is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. In some embodiments, the MPMD is present in the at least two monomers in an amount of from about 25 mol. % to about 75 mol. %, for example about 25 mol. %, about 30 mol. %, about 35 mol. %, about 40 mol. %, about 45 mol. %, about 50 mol. %, about 55 mol. %, about 60 mol. %, about 65 mol. %, about 70 mol. %, about 75 mol. %, or any ranges therebetween. For example, in one embodiment, the DMDC is present in the at least two monomers in an amount of about 50 mol. % and the MPMD is present in the at least two monomers in an amount of about 50 mol. %.

In some embodiments, sebacic acid is present in the organic diacid in an amount of less than or equal to about 50 mol. %, for example about 50 mol. %, about 45 mol. %, mol. %, about 40 mol. %, about 35 mol. %, about 30 mol. %, about 25 mol. %, about 20 mol. %, about 15 mol. %, about 10 mol. %, about 5 mol. %, about 4 mol. %, about 3 mol. %, about 2 mol. %, about 1 mol. %, about 0 mol. %, or any ranges therebetween. For example, in some embodiments, sebacic acid is present in the organic diacid in an amount of about 50 mol. % and dodecanedioic acid is present in the organic diacid in an amount of about 50 mol. %. In other embodiments, sebacic acid is present in the organic diacid in an amount of about 50 mol. % and isophthalic acid is present in the organic diacid in an amount of about 50 mol. %.

In some embodiments, the organic diacid is substantially free of sebacic acid.

In some embodiments, the organic diacid includes one or more C10-C18 aliphatic dicarboxylic acids. For example, in some embodiments, the organic diacid may include one or more C10-C18 aliphatic dicarboxylic acids. For example, the organic diacid may include dodecanedioic acid, tridecanedioic acid, hexadecanedioic acid, tridecanedioic acid, tetradecanedioic acid, pentadecanedioic acid, hexadecanedioic acid, heptadecanedioic acid, octadecanedioic acid, or any combinations thereof.

In some embodiments the organic diacid is dodecanedioic acid, isophthalic acid, or any combinations thereof.

In some embodiments, a C10-C18 aliphatic dicarboxylic acid is present in the organic diacid in an amount of from 50 mol. % to about 100 mol. %, for example about 50 mol. %, about 55 mol. %, 60 mol. %, about 65 mol. %, about 70 mol. %, about 75 mol. %, about 80 mol. %, about 85 mol. %, about 90 mol. %, about 95 mol. %, about 100 mol. %, and any ranges therebetween. In some embodiments, isophthalic acid is present in the organic diacid in an amount of from about 0 mol. % to about 50 mol. %, for example 0 mol. %, about 5 mol. %, about 10 mol. %, about 15 mol. %, about 20 mol. %, about 25 mol. %, about 30 mol. %, about 35 mol. %, about 40 mol. %, about 45 mol. %, about 50 mol. %, and any ranges therebetween.

In some embodiments, the resin may comprise C10 and greater aliphatic chains. For example, C10 aliphatic chains, C11 aliphatic chains, C12 aliphatic chains, C13 aliphatic chains, C14 aliphatic chains, C15 aliphatic chains, C16 aliphatic chains, C17 aliphatic chains, C18 aliphatic chains, C19 aliphatic chains, C20 aliphatic chains, and any combinations thereof. In some embodiments, the resin includes an aliphatic diacid content in an amount of at least about 2 wt. %, for example about 2 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, or any ranges therebetween.

In some embodiments, the polyamide resin has a glass transition temperature ($T_g$) of at least about 75° C., for example about 75° C., about 80° C., about 85° C., about 90° C., about 95° C., about 100° C., about 101° C., about 105° C., about 110° C., about 115° C., about 120° C., about 130° C., about 135° C., about 140° C., about 145° C., about 150° C., and any ranges therebetween.

In some embodiments, the polyamide resin is clear. For example, in some embodiments, a 3 mm thick sample of the polyamide resin will have a total transmittance of at least about 80% when measured by a spectrophotometer according to ASTM D1003. For example, in some embodiments, a 3 mm thick sample of the polyamide resin will have a total transmittance of about 80%, about 85%, about 88%, about 90%, about 91.3%, about 95%, about 96%, about 97%, about 98%, and any ranges therebetween when measured by a spectrophotometer according to ASTM D1003.

In some embodiments, the polyamide resin includes one or more additives. For example, in some embodiments the polyamide resin includes a pigment, a dye, a heat stabilizer, a UV stabilizer, a lubricant, an antistatic agent, an optical brightener, or any combinations thereof. For example, heat stabilizers and antioxidants may include hindered phenol, phosphite, copper complex compounds, and any combinations thereof. UV stabilizers may include, for example, HALS compounds, UV absorbers, oxanilides, and any combinations thereof. Optical brighteners may include, for example, fluorescent whiteners including benzoxazole. Lubricants may include, for example, metal stearate, aminated olefin compounds, and combinations thereof.

In some embodiments, molecular weight of the polyamide resin may be regulated by, for example, combining a catalyst and an end group modifier. For example, in some embodiments, the polyamide resin may further include a phosphorous compound such as phosphorous acid, hypophosphorous acid, metal salts of phosphorous, and any combinations thereof. In some embodiments, the polyamide resin may further include end group modifiers such as acetic acid, benzoic acid, and the like.

In some embodiments, the polyamide resin has a surface energy of about 38 dyne/cm. For example, in some embodiments, the polyamide resin has a surface energy of about 30 dyne/cm, about 32 dyne/cm, about 34 dyne/cm, about 36 dyne/cm, about 38 dyne/cm, about 40 dyne/cm, about 42 dyne/cm, about 44 dyne/cm, about 46 dyne/cm, about 48 dyne/cm, about 50 dyne/cm, and any ranges therebetween.

In some embodiments, articles are provided including any of the resins described above. For example, in some embodiments articles are provided which consist entirely of the resins described above. In some embodiments, articles are provided which merely contain one or more parts made from the resins described above.

For example, in some embodiments the article may be an eyewear lens, such as a lens for prescription or nonprescription glasses, reading glasses, sunglasses, and the like; an eyewear frame, such as a lens for prescription or nonprescription glasses, reading glasses, sunglasses, and the like; an electronic device, such as a cellphone, headphones, and the like; a wearable device, such as a fitness tracker, watch, jewelry, or headphones; a container, such as a bottle, jar, bowl, lidded container, and the like; or lenses or housing for medical equipment or sensors, such as containers, electronics, surgery equipment, sanitary equipment, and the like designed particularly for medical uses.

In some embodiments, the article further includes an overmold layer. That is, in some embodiments the article includes a layer of a second type of polymer, such as a thermoplastic polymer. For example, in some embodiments the overmold layer includes a thermoplastic urethane (TPU) resin or a thermoplastic elastomer (TPE) resin. In some embodiments, the TPU resin comprises a polyether, polyester, or aliphatic TPU resin. In some embodiments, the TPU resin comprises a polyether, polyester, or aliphatic polyol.

In some embodiments, methods of making an article are provided, including injection molding, extruding, or continuously molding any of the resins described above. In some embodiments, the methods further include overmolding a thermoplastic urethane (TPU) resin or a thermoplastic elastomer (TPE) resin. Advantageously, in some embodiments, the method includes continuously molding the resin, that is, molding the resin in a continuous manufacturing process, without the use of a mold-release spray, such as a silicone mold-release spray.

EXAMPLES

Embodiments of the present disclosure may be better understood by reference to the following examples.

Example 1: Preparing Polyamide Resins

Several polyamide copolymer compositions were prepared from mixtures of HMDA, BAC, IPDA, DMDC, and MPMD, using mixtures of sebacic acid, dodecanedioic acid, and isophthalic acid, and compared to a resin available from Shakespeare Company, as shown in Table 1 below:

TABLE 1

| Sample No. | Mol. % HMDA | Mol. % BAC | Mol. % IPDA | Mol. % DMDC | Mol. % MPMD | Mol. % Sebacic Acid | Mol. % Dodecanedioic Acid | Mol. % Isophthalic Acid |
|---|---|---|---|---|---|---|---|---|
| 1 | 50 | 0 | 0 | 50 | 0 | 0 | 75 | 25 |
| 2 | 30 | 0 | 0 | 70 | 0 | 0 | 100 | 0 |
| 3 | 0 | 50 | 0 | 50 | 0 | 0 | 100 | 0 |
| 4 | 0 | 0 | 0 | 50 | 50 | 0 | 100 | 0 |
| 5 | 0 | 0 | 50 | 50 | 0 | 0 | 100 | 0 |
| Shakespeare Company resin | 50 | 0 | 0 | 50 | 0 | 75 | 0 | 25 |

To prepare the polymer of sample no. 1, a charge of 285.3 g HMDA, 586.7 g DMDC, 204.4 g isophthalic acid, and 850.1 g dodecanedioic acid was added to 2000 g of water. The mixture was heated to about 80° C. with agitation until a homogeneous salt was formed. Then, 1 gram of antifoam and 10 mg of sodium hypophosphinate were added to the salt mixture, and the resulting antifoam, sodium hypophosphinate and salt mixture was transferred to a Parr Instrument reactor. The reactor was pressurized to 150 psi at temperature of 215° C., and was then depressurized at a rate of 2.5 psi per minute until 30 psi. Once reaction temperature reached 270° C., vacuum was applied until the resin polymerized to a target viscosity of 5 g/10 minutes when tested at 250° C. and a 2160 g load according to ASTM D1238. Next, the resin was stranded, cooled under water, and chopped into pellet form. This yielded about 650 g of resin pellets.

To prepare the polymer of sample 2, a charge of 155.3 g of HMDA, 737.4 g of DMDC, and 1017.6 g dodecanedioic acid was added to 2000 g of water. The mixture was heated to about 80° C. with agitation until a homogeneous salt was formed. Then, 200 mg of antifoam and 15 mg of sodium hypophosphite was added to the salt mixture and transferred to a Parr Instrument reactor. The reactor was pressurized to 150 psi at temperature of 230° C. and then depressurized at a rate of 2.5 psi per minute until reaching a pressure of 30 psi. Once the reaction temperature reached 270° C., a vacuum was applied until the resin polymerizes to a target viscosity of 5 g/10 minutes when tested at 250° C. and a 2160 g load according to ASTM D1238. The resulting resin was stranded, cooled under water, and chopped into pellet form. This yielded about 780 g of resin pellets.

To prepare the polymer of sample 3, a charge of 323.6 g of BAC, 542.4 g of DMDC, and 1047.8 g dodecanedioic acid was added to 2000 g of water. The mixture was heated to about 80° C. with agitation until a homogeneous salt was formed. Then, 200 mg of antifoam and 15 mg of sodium hypophosphite were added to the salt mixture and transferred to a Parr Instrument reactor. The reactor was pressurized to 150 psi at temperature of 235° C., and then depressurized at a rate of 2.5 psi per minute until reaching a pressure of 30 psi. Once the reaction temperature reached 270° C., a vacuum was applied until the resin polymerized to a target viscosity of 5 g/10 minutes when tested at 250° C. and a 2160 g load according to ASTM D1238. The resin was then stranded, cooled under water, and chopped into pellet form. This yielded about 80 g of resin pellets. To prepare the polymer of sample no. 4, a charge of 569.4 g DMDC, 273.6 g MPMD, and 1084.5 g dodecanedioic acid was added to 2000 g of water. The mixture was heated to about 80° C. with agitation until a homogeneous salt was formed. Then, 200 mg of antifoam and 15 mg of sodium hypophosphinate were added to the salt mixture, and the resulting antifoam, sodium hypophosphinate and salt mixture was transferred to a Parr Instrument reactor. The reactor was pressurized to 150 psi at temperature of 215° C., and was then depressurized at a rate of 2.5 psi per minute until 30 psi. Once reaction temperature reached 270° C., vacuum was applied until the resin polymerized to a target viscosity of 5 g/10 minutes when tested at 250° C. and a 2160 g load according to ASTM D1238. Next, the resin was stranded, cooled under water, and chopped into pellet form. This yielded about 600 g of resin pellets.

To prepare the polymer of sample no. 5, a charge of 376.8 g IPDA, 523.3 g DMDC, and 1011 g dodecanedioic acid was added to 2000 g of water. The mixture was heated to about 80° C. with agitation until a homogeneous salt was formed. Then, 200 mg of antifoam and 115 mg of sodium hypophosphinate were added to the salt mixture, and the resulting antifoam, sodium hypophosphinate and salt mixture was transferred to a Parr Instrument reactor. The reactor was pressurized to 150 psi at temperature of 230° C., and was then depressurized at a rate of 2.5 psi per minute until 30 psi. Once reaction temperature reached 270° C., vacuum was applied until the resin polymerized to a target viscosity of 5 g/10 minutes when tested at 250° C. and a 2160 g load according to ASTM D1238. Next, the resin was stranded, cooled under water, and chopped into pellet form. This yielded about 858 g of resin pellets.

Example 2: Physical Characterization of Polyamide Resins

First, the glass transition temperature ($T_g$) of each of the sample resins of Example 1 was measured by Differential Scanning calorimetry at a heating rate of 20° C./min. The glass transition temperature of each of these resins is shown in Table 2 below:

TABLE 2

| Sample No. | $T_g$ (° C.) |
|---|---|
| 1 | 113 |
| 2 | 115 |
| 3 | 112 |
| 4 | 93 |
| 5 | 136 |
| Shakespeare Company resin | 119 |

Next, the specific gravity, tensile strength, tensile modulus, tensile elongation, impact resistance, flex modulus, and flex stress of several of the resins of Example 1 were measured according to ASTM D792, D638, and D790. The total transmittance of the resin of sample 1 was measured on a 3.125 mm thick injection molded bar according to ASTM D1003 by a spectrophotometer. These results are shown in Table 3 below:

TABLE 3

| Sample No. | Specific Gravity (g/cc) | Tensile Strength (psi) | Tensile Modulus (psi) | Tensile Elongation (%) | Impact Resistance (ft-lb/in) | Flex Modulus (psi) | Flex Stress (psi) | Total Transmittance |
|---|---|---|---|---|---|---|---|---|
| 1 | 1.039 | 9668 | 267752 | >180 | 1.52 | 254394 | 14408 | 91.3% |
| Shakespeare Company resin | 1.08 | 6770 | 275000 | — | 1.32 | — | — | — |

As can be seen from these results, the polyamide of sample no. 1 has good strength and flexibility. This polyamide was also suitable for injection molding, is chemically-resistant to alcohols, and has a relatively high surface energy, which allows the resin to have improved paint adhesion properties. Specifically, the surface energy of this resin was measured to be 38 dyne/cm. This is significantly higher than the surface energy of commercially-available polyamide resins, which have a surface energy of only 30 dyne/cm.

Example 3: Comparison of Polyamide Resin to Commercial Resin

Figure 2:
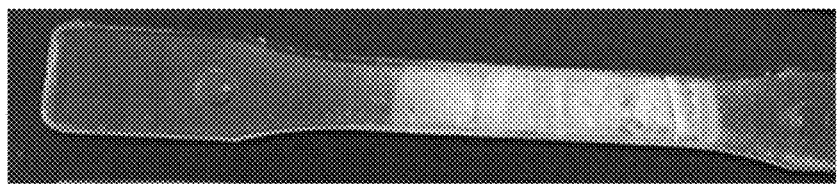
FIG. 2 is a photograph of a sample of a resin according to an embodiment of the present disclosure after soaking in ethanol under bending stress.
Figure 1:
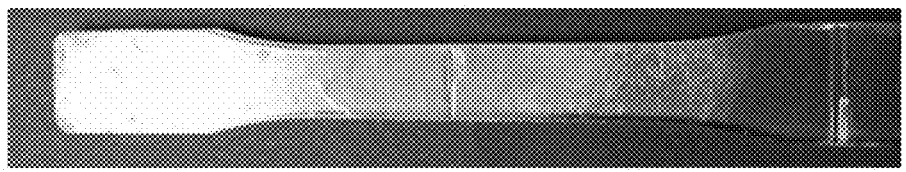
FIG. 1 is a photograph of a sample of a comparative thermoplastic resin after soaking in ethanol under bending stress.

The resin of sample 1 and a sample of a comparative clear thermoplastic polyamide resin consisting of the reaction product of DMDC and dodecanedioic acid at a 1:1 molar ratio were injection molded into ASTM D638 type I bars measuring approximately 3.125 mm thick. These two bars were soaked in Ethanol for 1 hour under a bending stress of about 3000 psi. A photo of the bar made from the resin of sample 1 is shown in FIG. 2, a photo of the bar made from the comparative clear thermoplastic polyamide resin is shown in FIG. 1, and a photo of the bar made from the Shakespeare Company resin is shown in FIG. 3. As can be seen by comparing FIGS. 1-3, the resin of sample 1 surprisingly remained much clearer after soaking in ethanol than the comparative clear thermoplastic polyamide resin, while maintaining adequate structural integrity, and surprisingly even remained much clearer than the Shakespeare Company resin. The continued clarity and structural integrity of the bar shown in FIG. 2 indicate that the resin of sample 1 has both excellent strength and chemical resistance properties.

Example 4: Overmolding of Polyamide Resins

Thermoplastic urethane (TPU) overmolding was simulated using the polyamide resin sample 1 of Example 1 through insert molding. First, the polyamide resin was processed with a feed temperature of 130° F. and passed through three separate zones having temperatures of 410° F., 420° F., and 440° F., respectively, before passing through a nozzle having a temperature of 440° F. The extruded clear polyamide resin was then injection molded using 100 Ton Demag injection molder. Specifically, the clear polyamide resin was injected at a speed of 2 inches per second into a mold having a temperature of 110° F., for a fill time of 1.1 seconds, at pack and hold pressure 500 PSI, and held for 1.5 seconds to form a molded polyamide part. Specifically, the molded polyamide part was a lens cover. This same process was followed to produce two essentially identical molded polyamide parts.

Figure 4:
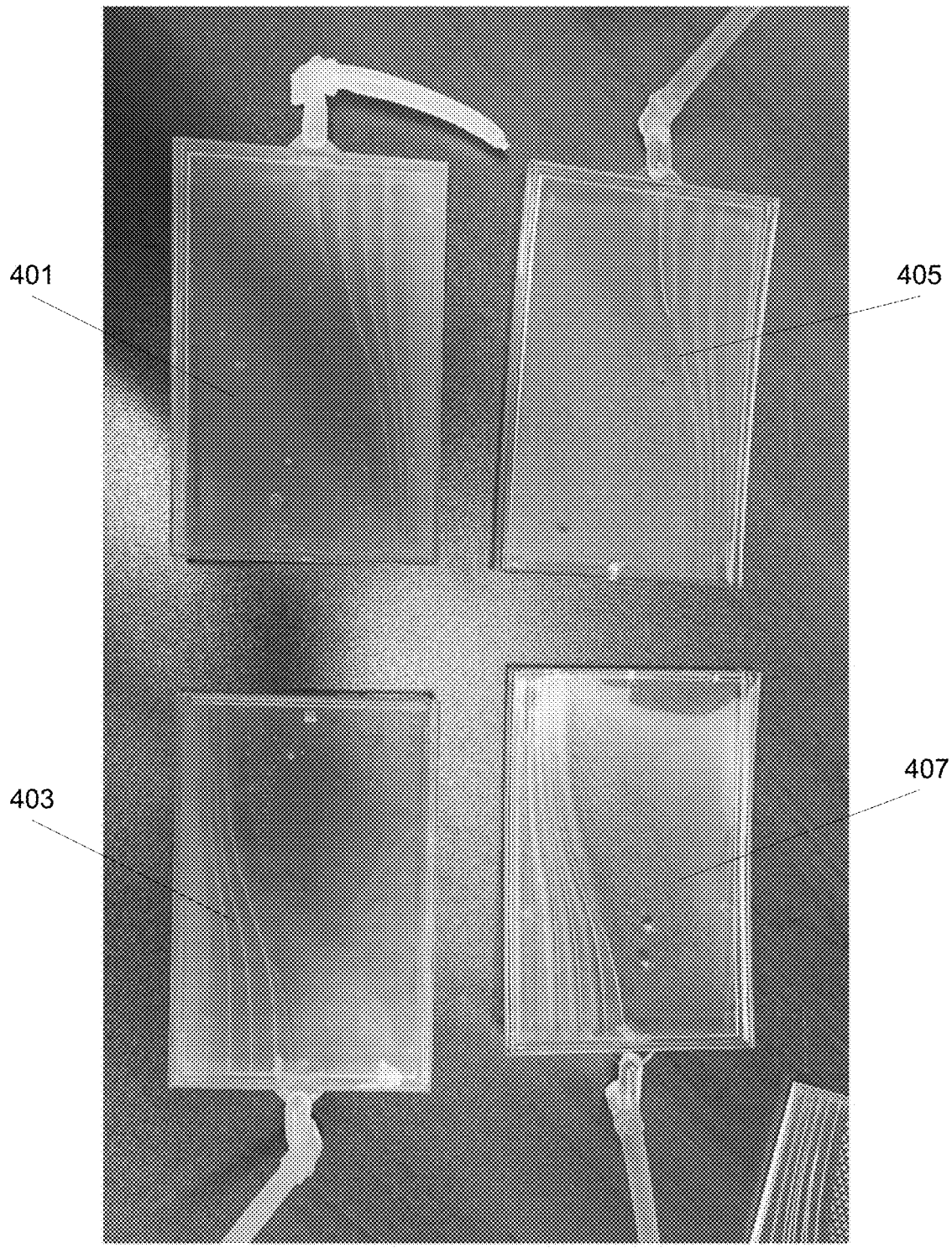
FIG. 4 is a photograph of several overmolded polyamide parts according to embodiments of the present disclosure.
Figure 5:
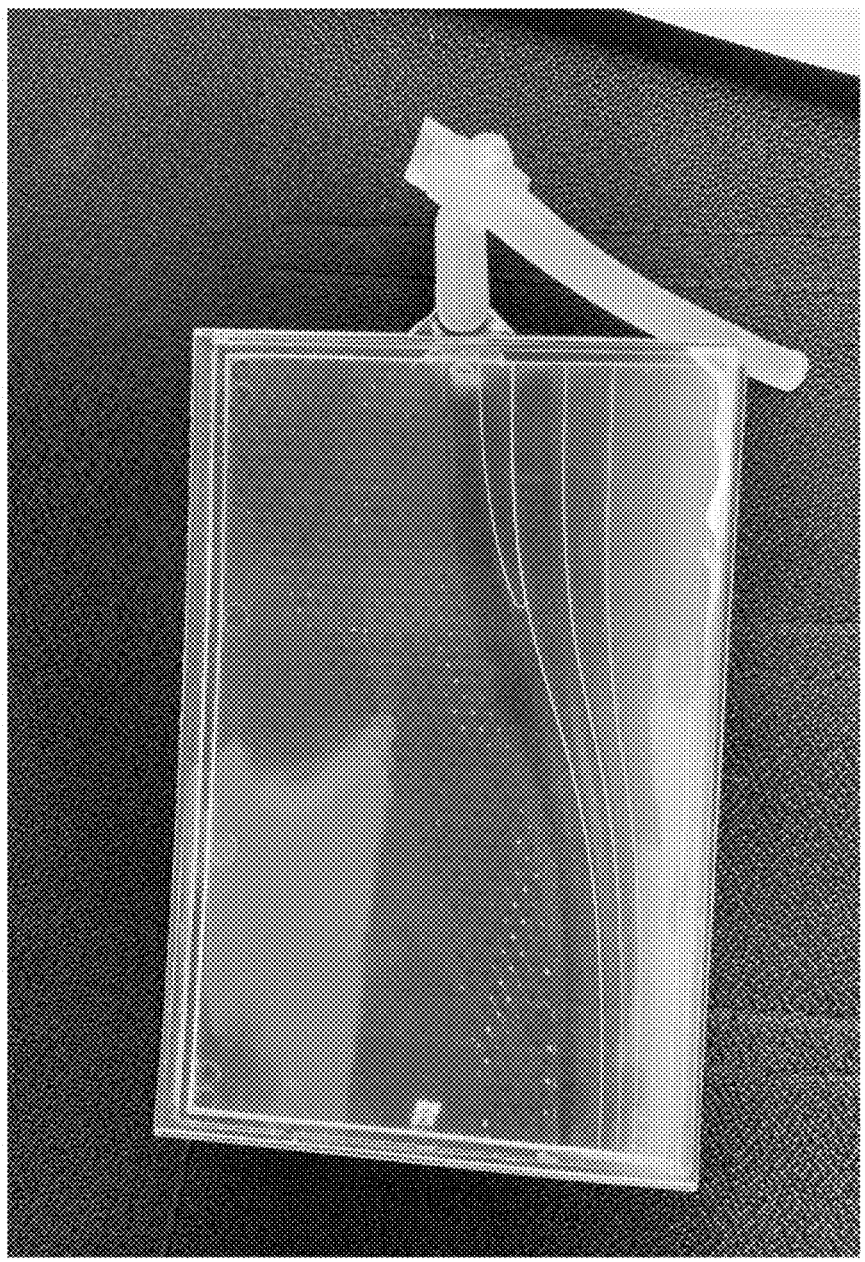
FIG. 5 is a photograph of one of the overmolded polyamide parts of FIG. 4 against a black background.

Each molded polyamide part was then inserted into a second mold with insert pins, and an overmolding resin was applied to the mold to provide a gasket on the lens cover. The resulting overmolded polyamide parts are shown in in FIG. 4. Specifically, the overmolded parts using 65A polyester TPU are shown as 401 and 403, and the overmolded parts using 87A polyether TPU 405 and 407. The mold contained tiny features in a portion of the mold, designed to explore surface energy challenges that often occur in two-system parts. Some of these features can be more clearly seen in FIG. 5, which shows the overmolded part 401 against a black background to highlight these small features. Several different overmolding resins were used, including a thermoplastic elastomer (TPE) and a thermoplastic urethane (TPU). The specific mold conditions used to produce and apply each overmolding resin are shown in Table 4 below:

TABLE 4

| Process Conditions | Overmolting Resin | |
| --- | --- | --- |
| | 65A polyester TPU (Elastollan AC 65 A 12 HPM) | 87A polyether TPU (Elastollan 1185A10) |
| Feed Temperature | 130° F. | 130° F. |
| Zone 1 Extruder Temperature | 300° F. | 300° F. |
| Zone 2 Extruder Temperature | 350° F. | 350° F. |
| Zone 3 Extruder Temperature | 360° F. | 360° F. |
| Nozzle Temperature | 330° F. | 330° F. |
| Mold Temperature | 90° F. | 90° F. |
| Fill Time | 1.2 seconds | 1.3 seconds |
| Pack and Hold Pressure | 350 PSI | 340 PSI |
| Injection Speed | 2 inches/second | 2 inches/second |
| Hold Time | 1.5 seconds | 1.5 seconds |

Next, tensile tests were conducted on "short shots," that is, sections of the clear polyamide part which were not completely overmolded. These tensile tests showed failure at the overmolded resin, rather than at the interface between the clear polyamide part and the overmolded resin, indicating good chemical bonding between the clear nylon and the overmolding resins.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A polyamide resin comprising the reaction product of an intimate mixture of:
   at least two diamine monomers, wherein one of the at least two diamine monomers comprises HMDA present in the at least two diamine monomers in an amount of between about 25 mol. % and about 50 mol. %, and wherein one of the at least two diamine monomers comprises a cycloaliphatic diamine; and
   an organic diacid comprising isophthalic acid present in the organic acid in an amount of between about 10 mol. % and about 30 mol. %,
   wherein sebacic acid is present in the organic diacid in an amount of greater than 0 mol. % to about 50 mol. %.

2. The polyamide resin of claim 1, wherein one of the at least two diamine monomers is a cycloaliphatic diamine selected from BAC, DMDC, MACM, IPDA, or any combination thereof.

3. The polyamide resin of claim 1, wherein one of the at least two diamine monomers is MPMD.

4. The polyamide resin of claim 1, wherein one of the at least two diamine monomers is DMDC.

5. The polyamide resin of claim 4, wherein the DMDC is present in the at least two monomers in an amount of from about 25 mol. % to about 75 mol. %.

6. The polyamide resin of claim 1, wherein the at least two diamine monomers further comprise a cycloaliphatic diamine and DMDC.

7. The polyamide resin of claim 6, wherein the cycloaliphatic diamine is present in the at least two diamine monomers in an amount of from about 25 mol. % to about 75 mol. % and the DMDC is present in the at least two monomers in an amount of from about 25 mol. % to about 75 mol. %.

8. The polyamide resin of claim 1, wherein the at least two diamine monomers further comprise DMDC and MPMD.

9. The polyamide resin of claim 8, wherein the DMDC is present in the at least two diamine monomers in an amount of from about 25 mol. % to about 75 mol. % and the MPMD is present in the at least two monomers in an amount of from about 25 mol. % to about 75 mol. %.

10. The polyamide resin of claim 1, wherein the organic diacid further comprises one or more C10-C18 aliphatic dicarboxylic acids.

11. The polyamide resin of claim 1, wherein the organic diacid further comprises dodecanedioic acid.

12. The polyamide resin of claim 1, wherein the organic diacid comprises from about 70 mol. % to about 90 mol. % C10-C18 aliphatic dicarboxylic acid.

13. The polyamide resin of claim 12, wherein the aliphatic dicarboxylic acid comprises dodecanedioic acid.

14. The polyamide resin of claim 1, wherein the resin comprises C10 and greater aliphatic chains.

15. The polyamide resin of claim 1, wherein the polyamide resin has a glass transition temperature of at least about 110° C.

16. The polyamide resin of claim 1, wherein the polyamide resin is clear.

17. The polyamide resin of claim 16, wherein a 3 mm thick sample of the resin has a total transmittance of at least about 80% when measured by a spectrophotometer according to ASTM D1003.

18. The polyamide resin of claim 1, further comprising: a pigment, a dye, a heat stabilizer, a UV stabilizer, a lubricant, an antistatic agent, an optical brightener, or any combinations thereof.

19. The polyamide resin of claim 1, wherein the resin has a surface energy of about 38 dyne/cm.

\* \* \* \* \*